July 2, 1963     G. G. HOLLOWICH ETAL     3,096,512

MULTIPLE SYMBOL VISUAL PRESENTATION

Filed Sept. 22, 1960     3 Sheets-Sheet 1

INVENTORS
GARRISON G. HOLLOWICH
STUART N. McCULLOUGH
BY
ATTORNEY

July 2, 1963 G. G. HOLLOWICH ETAL 3,096,512
MULTIPLE SYMBOL VISUAL PRESENTATION
Filed Sept. 22, 1960 3 Sheets-Sheet 2
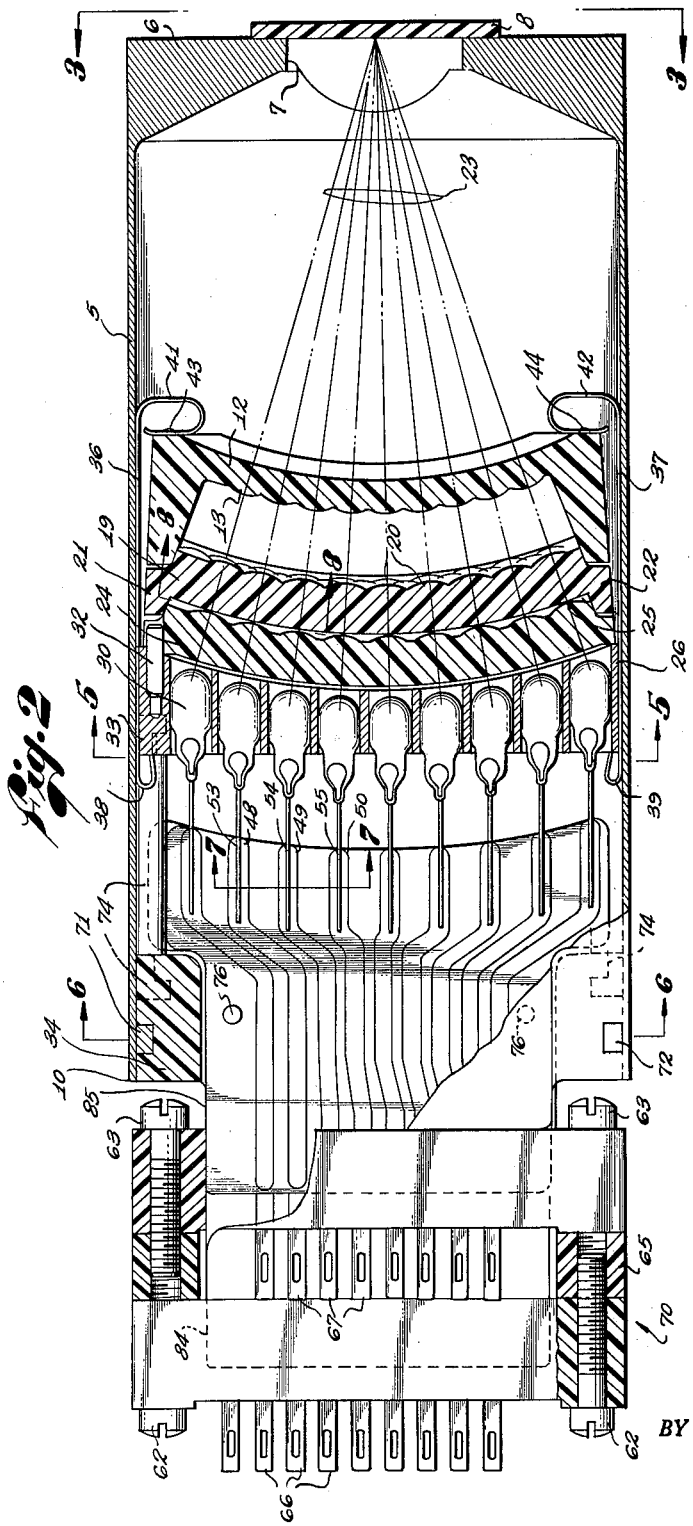
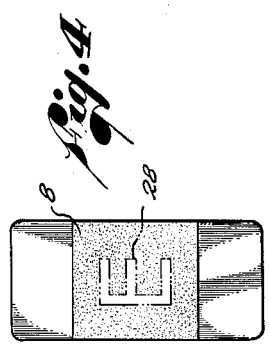
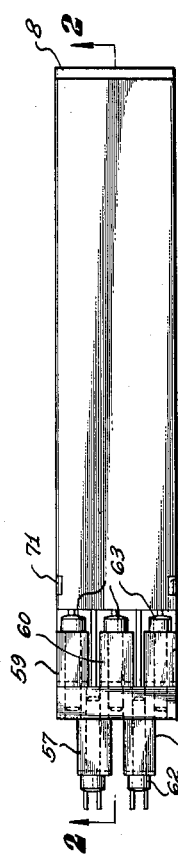
INVENTORS
GARRISON G. HOLLOWICH
STUART N. McCULLOUGH
BY
ATTORNEY July 2, 1963  G. G. HOLLOWICH ETAL  3,096,512
MULTIPLE SYMBOL VISUAL PRESENTATION
Filed Sept. 22, 1960  3 Sheets-Sheet 3

INVENTORS
GARRISON G. HOLLOWICH
STUART N. McCULLOUGH
BY
ATTORNEY

United States Patent Office 3,096,512
Patented July 2, 1963

3,096,512
MULTIPLE SYMBOL VISUAL PRESENTATION
Garrison G. Hollowich, Los Angeles, and Stuart N. McCullough, Encino, Calif., assignors to Tasker Instruments Corporation, Van Nuys, Calif., a corporation of California
Filed Sept. 22, 1960, Ser. No. 57,735
9 Claims. (Cl. 340—378)

This invention relates to the communication of intelligence in visual form, and particularly to a visual indicating device or module capable of the selective display of any one of a large number of symbols or characters, such as letters, numbers, etc. Several modules in array will provide the simultaneous presentation of a plurality of symbols.

Visual indicating devices are known, as evidenced by U.S. Patent No. 1,072,426, of September 9, 1913, showing an arcuate arrangement of light sources and lenses, and U.S. Patent No. 2,787,785, of April 2, 1957, showing another form of arcuate arrangement of light sources. The present invention is directed to the same general purpose as these prior devices but is one having novel features to provide for the observation of a particularly large number of symbols in the minimum of space with a predetermined maximum of brightness to obtain readability for many purposes, such as digital readout indicators. In the present embodiment of the invention, a single unit provides 43 individual symbols, which include the full alphabet, numerals from 0 to 9, inclusive, plus seven other symbols, such as plus and minus signs, etc. Any other combination of different symbols can be used.

The module embodying the invention has smooth exterior surfaces to permit the stacking of the modules adjacent to each other on the top, bottom, and sides with no inter-face separators. One preferred size of unit is slightly less than one inch wide, slightly less than two inches high, with a length of slightly more than five inches. The symbols on the viewing screen are approximately ½ inch by 9/16 of an inch. Each symbol or character has its own light source to facilitate the selection of each symbol, a two-wire circuit being employed to energize the lamps, which permits diode matrix decoding of digitalized information. The lamps are nested in a cellular metal lamphouse in direct contact with a metal casing to provide a sink for the lamp heat.

Maintenance has been simplified by grouping the lamps on five circuit boards within a block in the module. In this embodiment, each of three circuit boards mounts nine lamps, and each of the other two circuit boards mounts eight lamps, each circuit board being easily removable without special tools for the insertion of a new circuit board upon burn-out of any lamp. The burned out lamp may then be replaced at the maintenance bench. Thus, the module is rugged and trouble-free over a long period of service, and the elements therein easily accessible for maintenance. The module uses a group of molded lenses which are interlocked for rapid assembly and replacement if necessary.

The principal object of the invention, therefore, is to facilitate the presentation of visual indicia or symbols.

Another object of the invention is to provide an improved economical visual display module having no moving parts.

A further object of the invention is to provide a visual indicator in which a large number of symbols or characters may be displayed in the minimum of space with the maximum of reliability.

A better understanding of this invention may be had from the following detailed description when read in connection with the accompanying drawings, in which:

FIG. 2 is a cross-sectional view of the module shown in FIG. 1 and taken along the line 2—2 of FIG. 3;

FIG. 3 is a top view of the module shown in FIGS. 1 and 2;

FIG. 4 is an end view of the module taken along the line 3—3 of FIG. 2;

Figure 1:
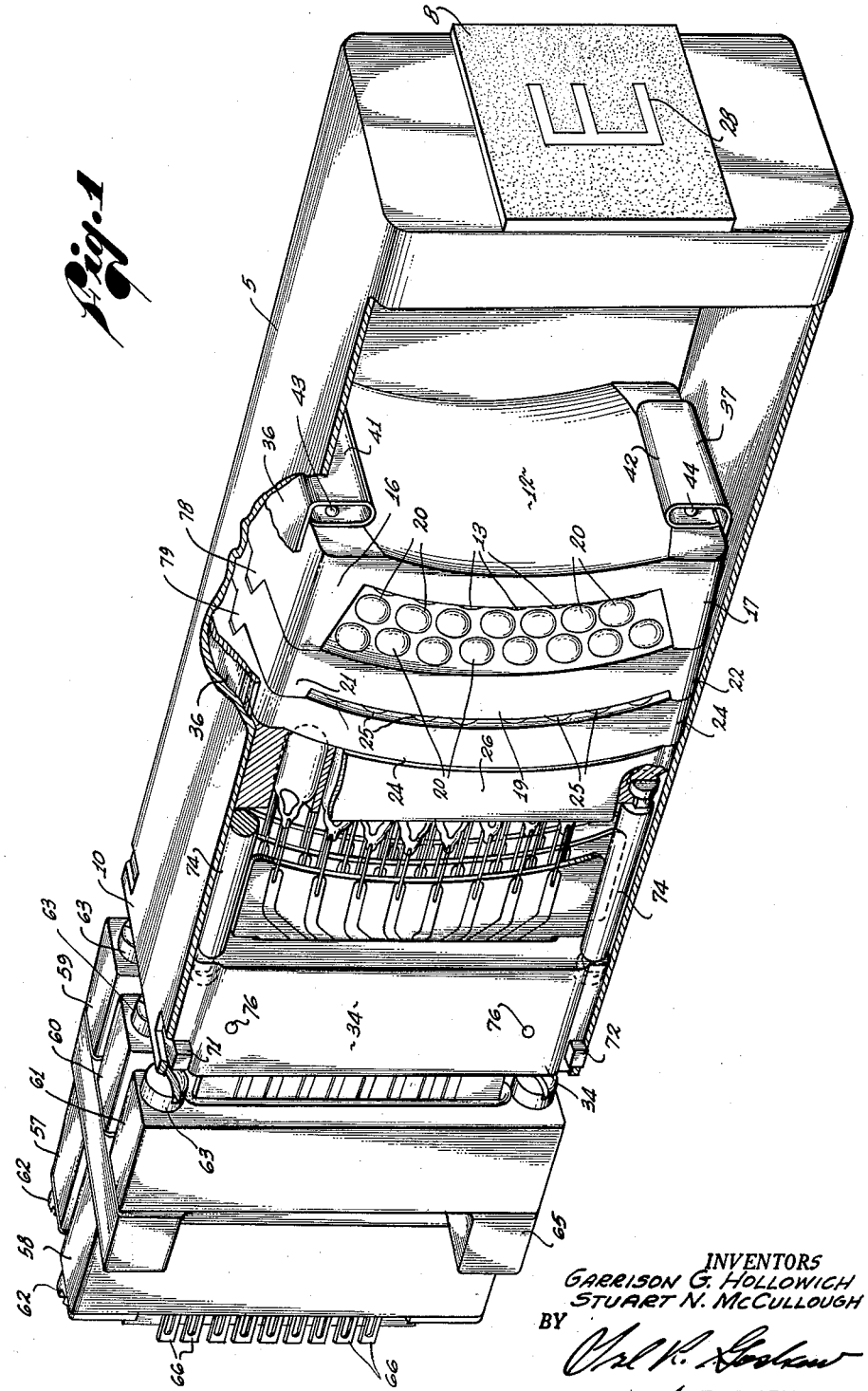
FIG. 1 is a cut-away perspective view of a module embodying the invention.

Referring now to the drawings in which the same elements are indicated by the same reference numerals, a rectangular casing 5, preferably of metal, has an internally tapered end section 6 with an opening 7 therein over which is mounted an observation medium 8, such as ground or opal glass, on which the symbols are observable when projected on the rear surface thereof. The other end 10 of the casing is open and through which the internal elements of the module are inserted as an assembled unit.

Figure 5:
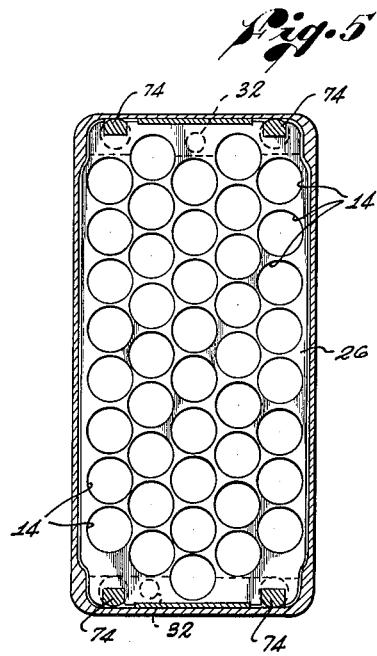
FIG. 5 is a cross-sectional view of the module taken along the line 5—5 of FIG. 2 without indicating the lamps.

Starting from the right hand side of the interior of the casing, a molded multiple projection lens element 12 has five staggered rows of convex lenses 13, the staggering being the same as shown for the lamp cells 14 in FIG. 5. This molded lens unit is arcuate in form and the spacing and optical axis of each lens is on a line from its respective lamp to the center of the viewing screen or observation medium 8, as shown by the center light ray lines 23. The upper and lower ends of the projection lens element 12 are tapered, as shown at 16 and 17, the ends thereof abutting the end portions of an arcuate field lens element 19, which also has the same number of rows and arrangement of staggered lenses 20 on the face thereof opposite the lenses 13 of the element 12. Each of the lenses 20 is positioned on its respective optical axis, as shown by the ray lines 23, and supplements the action of other lenses used in the optical system. This field lens element 19 also has tapered ends 21 and 22 which abut the end portions of an arcuate molded condenser lens element 24 having multiple lenses 25 thereon. This construction properly spaces the lenses from each other along their optical paths and fixes each lens element in vertical alignment. To fix the lens elements transversely of each other, the ends 16 and 17 of element 12 have central bosses, one of which is shown at 78, these bosses being accommodated snugly in notches in the ends 21 and 22 of element 19. Similarly, the ends 21 and 22 of element 19 have bosses, one of which is shown at 79, these bosses being accommodated snugly in notches in the ends of lens element 24. The lenses 25 are also staggered in five rows and positioned on their respective optical axes, as shown by ray lines 23.

Figure 8:
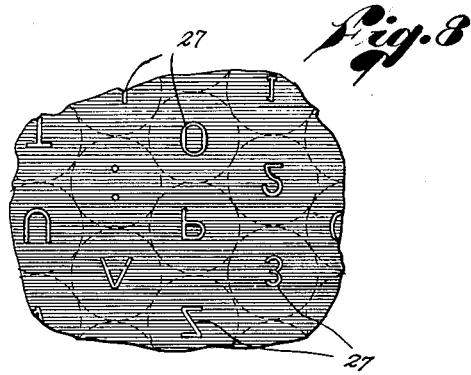
FIG. 8 is a detailed cross-sectional view taken along the line 8—8 of FIG. 2.

On the entrance faces of the field lenses 20 are placed in any suitable manner, such as by a photographic reproduction process, the various symbols or characters, several of which are shown at 27 in FIG. 8, the symbols appearing reversed in this figure vertically in order to properly appear on the observation medium 8, as shown by the letter "E" 28 in FIG. 1.

The next element to the left of the condensing lens unit 24 is a metal lamp cell block 26 having a front curvature similar to the rear curvature of the lens elements 24, while the rear surface of the cell block is planar. The staggered arrangement of the cells in which lamps 30 are positioned is shown at 14 in FIG. 5, the lamps being located on a spherical radius so that the length of the optical path for each symbol is the same to provide the same brightness of symbols upon the observation medium 8 and focus the images of all symbols within a common area on the medium 8. To the left of the lamp cell block 26 is a circuit board mounting block 34. Five circuit boards 81, 82, 83, 84, and 85 are shown in FIG. 6, a detail thereof being shown in FIG. 7, these boards being held in block 34 by pins 76.

The assembly just described, composed of the molded lens elements 12, 19, 24, and the lamp cell block 26, are held in oriented assembly by two pins 32 in the lamp cell block 26. To hold the elements just mentioned in longitudinal assembly, two flat springs 36 and 37 are provided, the respective rear ends 38 and 39 thereof being in the form of a loop with their ends abutting the lamp cell block 26, while the respective front ends 41 and 42 thereof are in the form of a loop and held in position on projections 43 and 44 of the lens element 12 when the projections are in suitable holes in the loop ends. The lamps 30 are held in the cell block by their semi-rigid conductor connections to the circuit boards. To hold circuit board block 34 in proper spaced relationship to lamp cell block 26, four corner keeper keys 74 are provided. Thus, the elements 12, 19, 24, 26 with its lamps 30, and 34 with its circuit boards, are inserted in casing 5 as an assembled unit. The unit is held in a fixed longitudinal position within the casing 5 by transverse keys 71 and 72. When a lamp burns out and the terminal sockets are disconnected, the keys 71 and 72 are removed, and the assembly may be taken from its casing. The group of lamps having the burned out lamp among them and its circuit board are then removed after the removal of pins 76, and a new circuit board with its respective lamps substituted.

Figure 6:
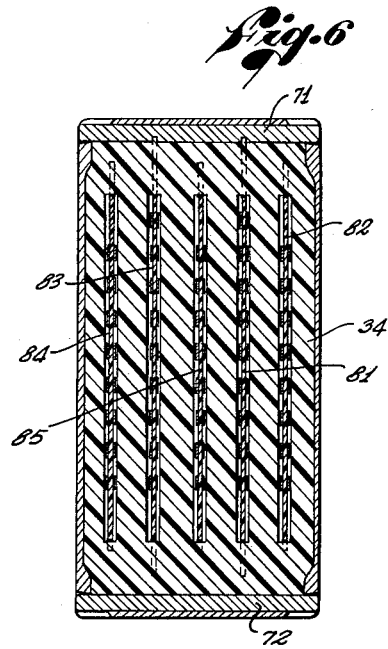
FIG. 6 is a cross-sectional view showing the circuit boards and taken along the line 6—6 of FIG. 2.
Figure 7:
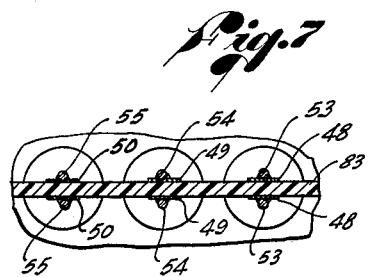
FIG. 7 is a detail cross-sectional view taken along the line 7—7 of FIG. 2.

Referring to FIGS. 6 and 7, each circuit board is provided with parallel conductors on each side of each board. These circuit boards are sheets of insulating material, such as shown at 83 in FIG. 7, on each side of which is plated or bonded conducting material in the form of a sheet, which is then etched away in the pattern shown to form separate conductors, a circuit pair being on opposite sides of the material, as shown at 48, 49 and 50 in FIG. 7. The terminals of each lamp are then soldered to the ends of the conducting strips 48, 49, and 50, as shown at 53, 54, and 55, respectively. All of the lamps 30 are similarly connected to their respective conducting strips on the five circuit boards 81—85 as shown in FIG. 6, the ends of the circuit boards extending from the end 10 of casing 5. Although the ends of each pair of conductors on one circuit board are staggered with respect to the ends of the pairs of conductors on adjacent circuit boards, the other ends of the conductors are in alignment transversely to facilitate attachment to aligned multiple sockets which will now be described.

As shown in FIGS. 2 and 6, circuit boards 82 and 84 are longer than circuit boards 81, 83, and 85. This variation in length is to permit simultaneous connections to be made to five external sockets 57, 58, 59, 60 and 61, having external rear-facing solder lugs such as shown at 66 and 67. The sockets 57 and 58 are mounted on one side of a mounting block 65 by screws 62 and sockets 59, 60 and 61 are mounted on the other side of mounting block 65 by screws 63. The internal ends of the solder lugs 66 and 67 are resiliently mounted in their respective sockets so that a pair of conductors on the circuit boards may be inserted between the internal ends of a respective pair of solder lugs. Thus, the unit of mounting block 65 and sockets 57—61 may be quickly connected to the module and quickly disconnected therefrom.

The above-described construction permits the images of a particularly large number of symbols to be presented on a common area of a rear projection observation medium with a particularly small economical module, while providing separate and individual circuits for each lamp for selecting the symbols.

We claim:
1. A visual indicator for selectively presenting a plurality of luminous symbols within a common area at mutually exclusive times comprising a casing, an observation medium at one end of said casing and to which images of said symbols are projected, an arcuate molded multiple projection lens element, an arcuate molded multiple field lens element, and an arcuate molded multiple condensing lens element, said lens elements being arranged in that order from said medium, a plurality of lamps positioned in arcuate alignment with the multiple lens of each of said lens elements, said lamps being positioned in parallel rows, a plurality of circuit boards having a plurality of conducting elements on each side thereof, each lamp being connected to a respective pair of conducting elements on opposite sides of a respective circuit board, and resiliently mounted terminals corresponding to the number of said conducting elements and attached to said circuit boards by friction.

2. A visual indicator in accordance with claim 1 in which said multiple projection lens element is composed of a plurality of individual convex lenses positioned thereon away from said observation medium with a common concave surface facing said observation medium, said multiple field lens element being composed of a plurality of individual convex elements facing the convex elements of said projection lens element with a common convex surface facing away from said observation medium, and said multiple condensing lens element being composed of a corresponding plurality of convex lens elements on the side thereof toward said observation medium with a common convex surface facing away from said observation medium.

3. A visual indicator in accordance with claim 1 in which said field lens element has mounted on the entrance face of each of said lenses the symbols for projection of said observation medium.

4. A visual indicator in accordance with claim 1 in which a mounting is provided for said circuit boards, each circuit board being individually assembled with a predetermined number of said lamps connected thereto.

5. A visual indicator in accordance with claim 4 in which said circuit boards are flat parallel positioned insulation sheets with flat conductors on each side thereof, two of said conductors on opposite sides of a board forming an energizing circuit for one lamp.

6. A module for observing a maximum number of symbols on a common observation area having a certain light brightness comprising a rectangular casing having flat exterior surfaces with openings at each end thereof, an observation medium over one of said openings, a lamp cell block within said casing having parallel rows of holes therein, a plurality of lamps mounted in an arc in the cells of said block, an arcuate molded light transmitting element having a plurality of condensing lens elements on the side thereof toward said observation medium and arranged in parallel rows corresponding to the rows of said cells, a transparent field lens element adjacent said condensing lens element and having a plurality of convex lenses on the surface thereof toward said observation medium and arranged in parallel rows corresponding in number to said first-mentioned lens elements, a projection lens having a plurality of convex lenses on the surface thereof and corresponding in number and parallel row arrangement to said first and second-mentioned lenses, a mounting block in said casing, and a plurality of flat parallel spaced circuit boards mounted in said block and having parallel rows of conductors thereon for connection to said lamps.

7. A module in accordance with claim 6 in which are provided electrical terminals corresponding in number with said parallel rows of conductors, one pair of ends of said terminals being resilient for connecting said terminals to said conductors by friction.

8. A module for selectively presenting a plurality of symbol images for observation on a common area comprising a casing having flat exterior surfaces, an opening at one end of said casing, an observation medium over said opening for transmitting light projected on one surface thereof, a plurality of light sources in said casing, a plurality of light condensing and projection lens units in said casing between said light sources and said observation medium, each of said units being a single molded element with individual convex surfaces on one side thereof, said projection lens unit having mating ends abutting an adjacent unit to shape said units along their optical axes, interlocking means on said mating ends to position said units with respect to one another and said light sources, symbols on the entrance surfaces of a lens unit preceding said projection lens unit, a cellular block in said casing, one of said light sources being positioned in each of the cells of said block along a spherical arc, one of said convex surfaces of each of said molded lens units being on an optical axis between a corresponding light source and a point on said observation medium, a mounting block in said casing and positioned adjacent said cellular block, a plurality of flat parallel aligned circuit boards in said mounting block, said circuit boards having a plurality of flat conductors on each side thereof, connections between the ends of pairs of said conductors and said light sources, and means for holding said molded lens units, said cellular block and said mounting block in assembly for insertion in said casing.

9. A module in accordance with claim 8 in which a plurality of resiliently mounted terminal connectors are provided for frictional attachment to the other ends of said flat conductors.

References Cited in the file of this patent

UNITED STATES PATENTS

| | | |
|---|---|---|
| 2,931,027 | Blefary et al. | Mar. 20, 1960 |
| 2,959,758 | Geshner et al. | Nov. 8, 1960 |
| 3,041,600 | Gumpertz et al. | June 26, 1962 |

FOREIGN PATENTS

| | | |
|---|---|---|
| 741,246 | Great Britain | Apr. 23, 1953 |

OTHER REFERENCES

Publication, IBM Technical Disclosure Bulletin, vol. I, No. 2, August 1958, page 6.

"Display Equipment Lighting" by J. V. Collins, IBM Technical Disclosure Bulletin, vol. 3, No. 1, June 1960, page 1.